US010393863B2

(12) United States Patent
Sun et al.

(10) Patent No.: US 10,393,863 B2
(45) Date of Patent: Aug. 27, 2019

(54) LIDAR SYSTEM NOISE REDUCTION COMBINING CIRCULAR POLARIZATION LASER OUTPUT WITH PHOTON SIEVE OPTICS IN THE RECEIVER

(71) Applicant: U.S.A. as represented by the Administrator of the National Aeronautics and Space Administration, Washington, DC (US)

(72) Inventors: Wenbo Sun, Yorktown, VA (US); Yongxiang Hu, Yorktown, VA (US); David G. MacDonnell, Yorktown, VA (US)

(73) Assignee: UNITED STATES OF AMERICA AS REPRESENTED BY THE ADMINSTRATOR OF NASA, Washington, DC (US)

( * ) Notice: Subject to any disclaimer, the term of this patent is extended or adjusted under 35 U.S.C. 154(b) by 311 days.

(21) Appl. No.: 15/269,038

(22) Filed: Sep. 19, 2016

(65) Prior Publication Data

US 2018/0081044 A1    Mar. 22, 2018

(51) Int. Cl.
  *G01S 17/02*   (2006.01)
  *G01S 7/481*   (2006.01)
  *G01S 7/499*   (2006.01)

(52) U.S. Cl.
  CPC ............ *G01S 7/499* (2013.01); *G01S 7/4816* (2013.01); *G01S 17/02* (2013.01)

(58) Field of Classification Search
  CPC ......... G01S 7/499; G01S 7/4816; G01S 17/02
  See application file for complete search history.

(56) References Cited

U.S. PATENT DOCUMENTS

| | | | |
|---|---|---|---|
| 2011/0164783 A1* | 7/2011 | Hays | G01S 17/58 382/100 |
| 2013/0105747 A1* | 5/2013 | Galliher | B64G 1/222 254/133 R |
| 2016/0198954 A1* | 7/2016 | Wang | A61B 5/0095 600/407 |

(Continued)

OTHER PUBLICATIONS

Sun et al. "Technique to separate lidar signal and sunlight", Optics Express 12949, published Jun. 3, 2016.*

(Continued)

*Primary Examiner* — Eric L Bolda
(74) *Attorney, Agent, or Firm* — Andrea Z. Warmbier; Robin W. Edwards; Mark P. Dvorscak

(57) ABSTRACT

A lidar system includes an optical transmitter having a laser light source that is configured to generate a beam of light that is azimuthally polarized or has Orbital Angular Momentum (OAM). The lidar system further includes an optical receiver having an optical sensor defining a focal plane. A photon sieve is configured to produce a ring pattern on the focal plane corresponding to a laser return signal. The ring pattern comprises azimuthally polarized or Orbital Angular Momentum (OAM) light that is transmitted by the transmitter and reflected towards the receiver. The photon sieve is also configured to cause stray light that is not polarized to produce a central region at the center of the ring pattern that is distinct from the ring pattern.

16 Claims, 3 Drawing Sheets

(56) References Cited

U.S. PATENT DOCUMENTS

| | | | |
|---|---|---|---|
| 2016/0202283 A1* | 7/2016 | Wang | B64D 45/00 |
| | | | 356/28 |
| 2018/0048059 A1* | 2/2018 | Greschik | H01Q 1/08 |

OTHER PUBLICATIONS

Anderson, Geoff, Optical Design & Engineering "Photon sieve telescope: imaging with 10 million pinholes," Sep. 4, 2006, pp. 1-2.

Kipp, L., et al., Sharper images by focusing soft X-rays with photon sieves, Nature, pp. 184-188, Nov. 8, 2001, vol. 414.

Tang, Yan et al., Focusing property of high numerical aperture photon sieves based on vector diffraction, Optics Communications 295, 2013, pp. 1-4.

* cited by examiner

LIDAR SYSTEM NOISE REDUCTION COMBINING CIRCULAR POLARIZATION LASER OUTPUT WITH PHOTON SIEVE OPTICS IN THE RECEIVER

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Various types of lidar systems have been developed. Known space-based lidars typically require a telescope with sufficient area to increase the return signal on the detector to levels above the noise floor of the detectors. Two major drivers of the signal-to-noise ratio (SNR) on the detectors are the laser output energy and the round trip distance traveled by the laser signal. The SNR on the detectors can be increased by increasing the telescope reflector area or by decreasing the system noise. However, known methods to increase SNR may suffer from various drawbacks.

BRIEF SUMMARY OF THE INVENTION

One aspect of the present disclosure is a lidar system including an optical transmitter comprising a laser light source that is configured to generate a beam of azimuthally polarized light or light having Orbital Angular Momentum ("OAM light"). The lidar system further includes an optical receiver defining a focal plane, and a photon sieve configured to produce a ring pattern on the focal plane corresponding to a laser return signal. The ring pattern comprises azimuthally polarized or OAM light that is transmitted by the transmitter and reflected towards the receiver. The photon sieve is configured to cause stray light that is not polarized to produce a central region at the center of the ring pattern that is distinct from the ring pattern.

Another aspect of the present disclosure is a method of separating stray light from polarized laser light in a lidar system. The method includes generating a beam of azimuthally polarized or OAM light utilizing an optical transmitter comprising a laser light source. The method includes providing an optical receiver including optical sensors at a focal plane. A photon sieve is utilized to produce a ring pattern on the focal plane corresponding to a laser return signal. The ring pattern comprises azimuthally polarized or OAM light that is transmitted by the transmitter and reflected towards the receiver. The photon sieve is utilized to cause stray light that is not polarized to produce a central region at the center of the ring pattern that is distinct from the ring pattern.

These and other features, advantages, and objects of the present invention will be further understood and appreciated by those skilled in the art by reference to the following specification, claims, and appended drawings.

DETAILED DESCRIPTION OF THE INVENTION

Figure 1:
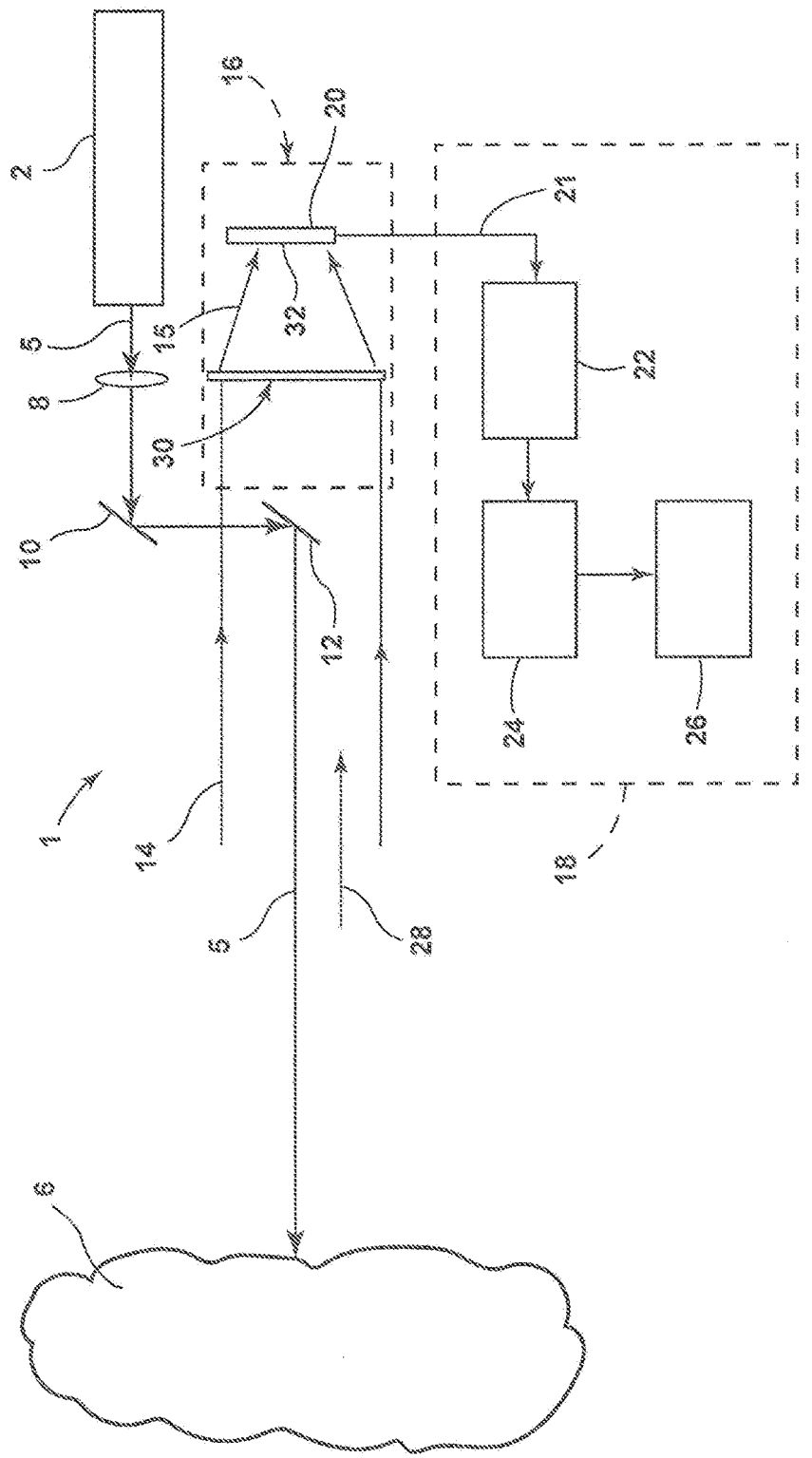
FIG. 1 is a schematic view of a lidar system.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed herein are not to be considered as limiting, unless the claims expressly state otherwise.

With reference to FIG. 1, a lidar system 1 includes a light source such as a laser 2 that produces an output signal such as laser beam 4. As discussed in more detail below, the laser beam may comprise azimuthally polarized or OAM light. The laser beam 4 is directed towards a target 6 by optical components 8, 10, and 12. The optical components 8, 10, and 12 may comprise known components such as a beam expander and/or mirrors, etc. as may be required for a particular lidar configuration. Thus, it will be understood that the present disclosure is not limited to the components shown in FIG. 1. The target 6 may comprise virtually any target that produces a return signal 14. In general, the laser 2 and optical components 8, 10, and 12 generate an output signal 5 that is directed towards a target 6.

As discussed in more detail below in connection with FIG. 2, a lidar receiving unit 16 includes a photon sieve 30 that directs return light 15 onto a focal plane 32 of a sensor such as photodetector 20 in a manner that separates return signal 14 from stray light 28. An electrical signal 21 from photodetector 20 is received by a system 18 that may include various components including an analog to digital convertor (A/D) 22, a processor 24, and an output device 26. It will be understood that the lidar system 1 may include various components as required for a particular configuration/application, and the present invention is not limited to the arrangement shown in FIG. 1.

Figure 2:
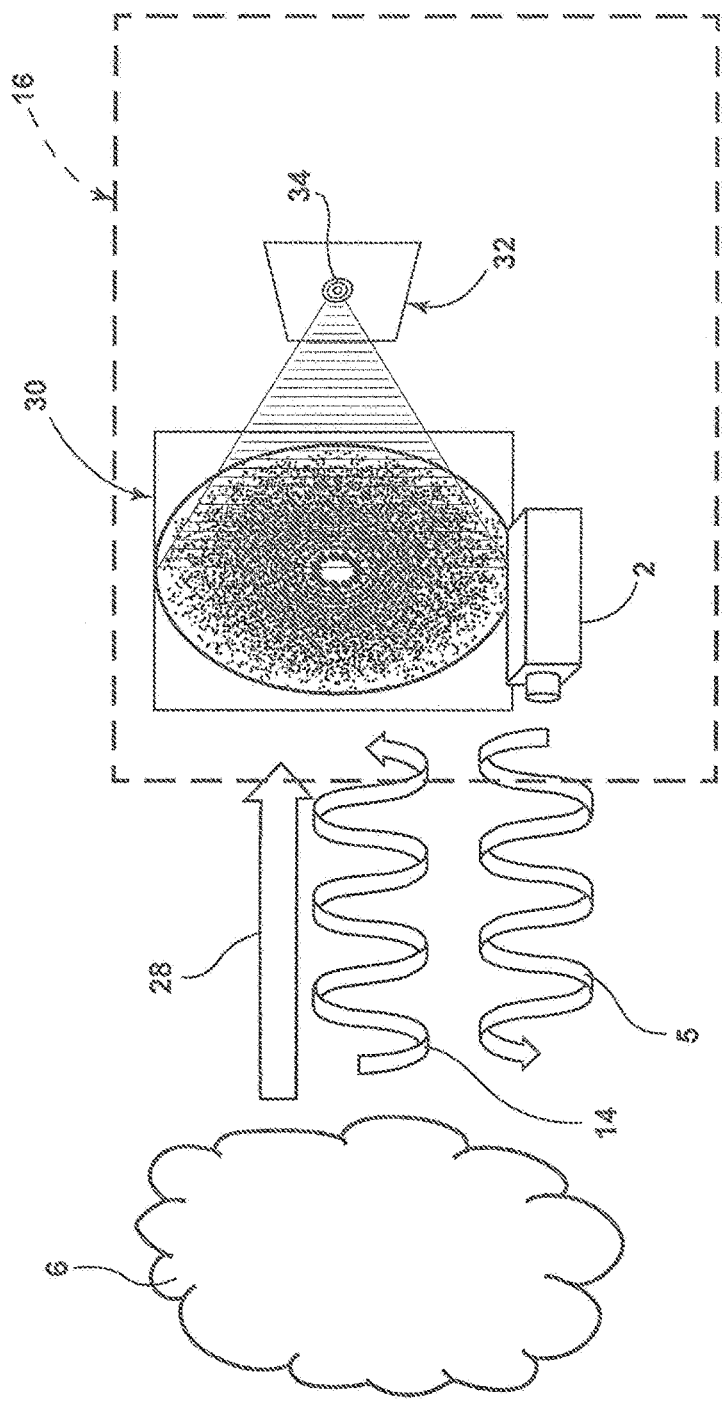
FIG. 2 is a schematic view of a portion of the lidar system of FIG. 1 showing a photon sieve and ring pattern on a focal plane.

With further reference to FIG. 2, in addition to the return signal 14, stray light or background noise 28 is also received by the lidar system 1. Noise 28 may comprise background noise. Noise 28 may comprise solar background light or other types of light from various sources other than light forming return signal 14. In general, the return signal 14 and noise 28 combine. This tends to lower the signal-to-noise ratio (SNR) on the detectors.

Figure 3:
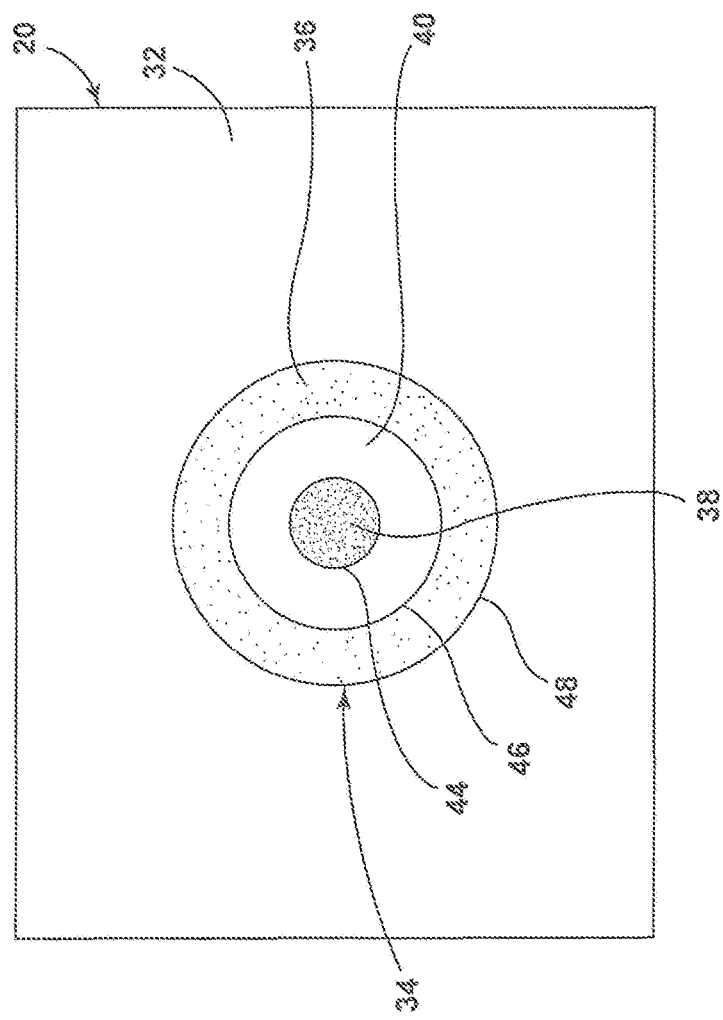
FIG. 3 is a schematic view of the focal plane and ring pattern.

The laser 2 of lidar system 1 is configured to produce an output signal 5 that comprises an azimuthally polarized or OAM laser beam. Photon sieve 30 is positioned such that the return signal 14 and noise 28 pass through the photon sieve 30 before reaching the focal plane 32. The photon sieve 30 provides magnification of the return signal 14 such that a conventional receiving telescope is not required. Photon sieve 30 is also configured to separate the return signal 14 and the noise 28. Specifically, as shown in FIG. 3 the photon sieve 30 causes the light to form a pattern 34 on focal plane 32 of photodetector 20 that includes a ring 36 and a central portion 38 that is separated from ring 36 by a space 40. In FIG. 3, central region 38 is bounded by a circular line 44, and ring 30 is bounded by circular lines 46 and 48. It will be understood that FIG. 3 is schematic, and the central region 38 and ring 30 may be bounded by transition regions in which the light intensity falls off rather than a "sharp" line at which light intensity goes from full intensity to zero intensity. Also, it will be understood that photon sieve 30 could be configured to produce other geometric patterns at focal plane 32 other than ring 36 and circle 38. The ring 36 is produced by the return signal 14, and the central portion 38 is formed by stray light or noise 28. Thus, on the focal plane 32 the light from return signal 14 is physically spaced apart and separated from the light from noise 28. The stray light (central portion 38) can be physically blocked or ignored, and the ring 36 corresponding to return signal 14 can be utilized for further processing in the lidar system 1.

The photon sieve 30 may comprise a flat, opaque membrane with a large number of holes in a radial pattern, in which the hole diameter decreases from distance from the center of the sieve. The defraction pattern of the light at the focal plane 32 experiences constructive interference at the center point, thereby producing magnification. The photon sieve 30 may be configured utilizing a known vector defraction model. An example of a vector defraction model is discussed in "Focusing Property of High Numerical Aperture Photon Sieves Based on Vector Defraction," Optics Communications, volume 295, 15 May 2013, pages 1-4, by Yan Tang, Song Hu, Yong Yang, Yu He. The defraction pattern of the light at the focal plane 32 experiences constructive interference at the center point producing magnification. It will be understood that a photon sieve 30 may be utilized with virtually any lidar system or technique.

Coupling the photon sieve 30 with azimuthal polarization or OAM provides natural filtering of solar background light (e.g. noise 28). Photon sieve 30 typically needs to have a larger area than a traditional telescope reflector dish to achieve the same signal level. However, the azimuthally polarized or Orbital Angular Momentum (OAM) laser enables new detector configurations by physically separating out the background light (noise 28).

The lidar system 1 may be utilized in, for example, space-based lidar systems, airborne lidar, or virtually any other lidar system or application. Furthermore, a photon sieve may also be utilized in laser communication systems to separate noise from the communication signal, or to add a parallel channel that can be diverted to separate detectors at the receiver. The technique described herein can be used for remote detection of any constituent with a unique spectral response.

What is claimed is:

1. A lidar system, comprising:
an optical transmitter comprising a laser light source configured to generate a beam of azimuthally polarized or Orbital Angular Momentum (OAM) light;
an optical receiver defining a focal plane;
a photon sieve configured to produce a ring pattern on the focal plane corresponding to a laser return signal, the ring pattern comprises azimuthally polarized or Orbital Angular Momentum (OAM) light that is transmitted by the transmitter and reflected towards the receiver, and wherein the photon sieve is further configured to cause stray light that is not polarized to produce a central region at the center of the ring pattern that is distinct from the ring pattern.

2. The lidar system of claim 1, wherein:
the photon sieve comprises an opaque membrane having a plurality of openings therethrough.

3. The lidar system of claim 2, wherein:
the openings are disposed in a radial pattern defining a center.

4. The lidar system of claim 3, wherein:
the holes define diameters, and wherein the diameters of the openings decrease with distance from the center.

5. The lidar system of claim 1, wherein:
the optical receiver comprises an optical sensor disposed at the focal plane.

6. The lidar system of claim 5, including:
an opaque member configured to block stray light at the central region whereby the stray light does not reach the sensor.

7. The lidar system of claim 5, including:
a processor operably connected to the optical sensor, wherein the processor is configured to distinguish sensor data corresponding to the ring pattern from sensor data corresponding to the central region.

8. The lidar system of claim 1, wherein:
the ring pattern defines circular inner and outer borders.

9. The lidar system of claim 8, wherein:
the central region defines a circular outer border that is spaced apart from the circular inner border of the ring pattern.

10. The lidar system of claim 1, wherein:
the photon sieve comprises a thin flexible membrane that can be deployed from a non-planar stowed configuration to a planar deployed configuration.

11. The lidar system of claim 1, wherein:
the photon sieve is configured to cause solar background light to produce a central region that is spaced apart from the ring pattern.

12. A method of separating stray light from polarized laser light in a lidar system, the method comprising:
generating a beam of azimuthally polarized or Orbital Angular Momentum (OAM) light utilizing an optical transmitter comprising a laser light source;
providing an optical receiver including optical sensors at a focal plane;
utilizing a photon sieve to produce a ring pattern on the focal plane corresponding to a laser return signal, the ring pattern comprising azimuthally polarized or Orbital Angular Momentum (OAM) light that is transmitted by the transmitter and reflected towards the receiver;
utilizing the photon sieve to cause stray light that is not polarized to produce a central region at the center of the ring pattern that is distinct from the ring pattern.

13. The method of claim 12, including:
utilizing a processor to distinguish data produced by optical sensors at the central region from data produced by optical sensors at the ring pattern.

14. The method of claim 12, including:
utilizing a blocking member to prevent stray light in a return signal from reaching the central region.

15. The method of claim 12, including:
positioning the lidar system on a satellite in orbit about a planet; and wherein:
the photon sieve is configured to cause solar light in the return signal to be directed to the central region.

16. The method of claim 15, wherein:
the photon sieve comprises a flexible membrane; and including:
flexing the membrane into a stowed configuration; and
deploying the photon sieve into a planar configuration when the satellite is in orbit.

* * * * *